H. SALSBURY.
RECREATION DEVICE.
APPLICATION FILED APR. 11, 1914.

1,127,094.

Patented Feb. 2, 1915.
3 SHEETS—SHEET 3.

WITNESSES

INVENTOR
HENRY SALSBURY
BY
ATTORNEY

UNITED STATES PATENT OFFICE.

HENRY SALSBURY, OF LONDON, ENGLAND.

RECREATION DEVICE.

1,127,094.  Specification of Letters Patent.  Patented Feb. 2, 1915.

Application filed April 11, 1914. Serial No. 831,261.

*To all whom it may concern:*

Be it known that I, HENRY SALSBURY, a subject of the King of Great Britain and Ireland, and residing at 11 Long Acre, London, W. C., England, have invented certain new and useful Improvements in Recreation Devices, of which the following is a specification.

This invention relates to a recreation device and has for its object to convey to an audience in a realistic manner the sensation of an aeroplane flight.

The invention consists in a recreation device comprising an aeroplane structure accommodating a number of persons and adapted to partake of movements substantially analogous to those of an actual aeroplane during flight so that when viewing appropriate animated pictures exhibited on a horizontal screen placed some distance below the structure the passengers therein shall experience the sensation of an actual flight.

Figure 1:
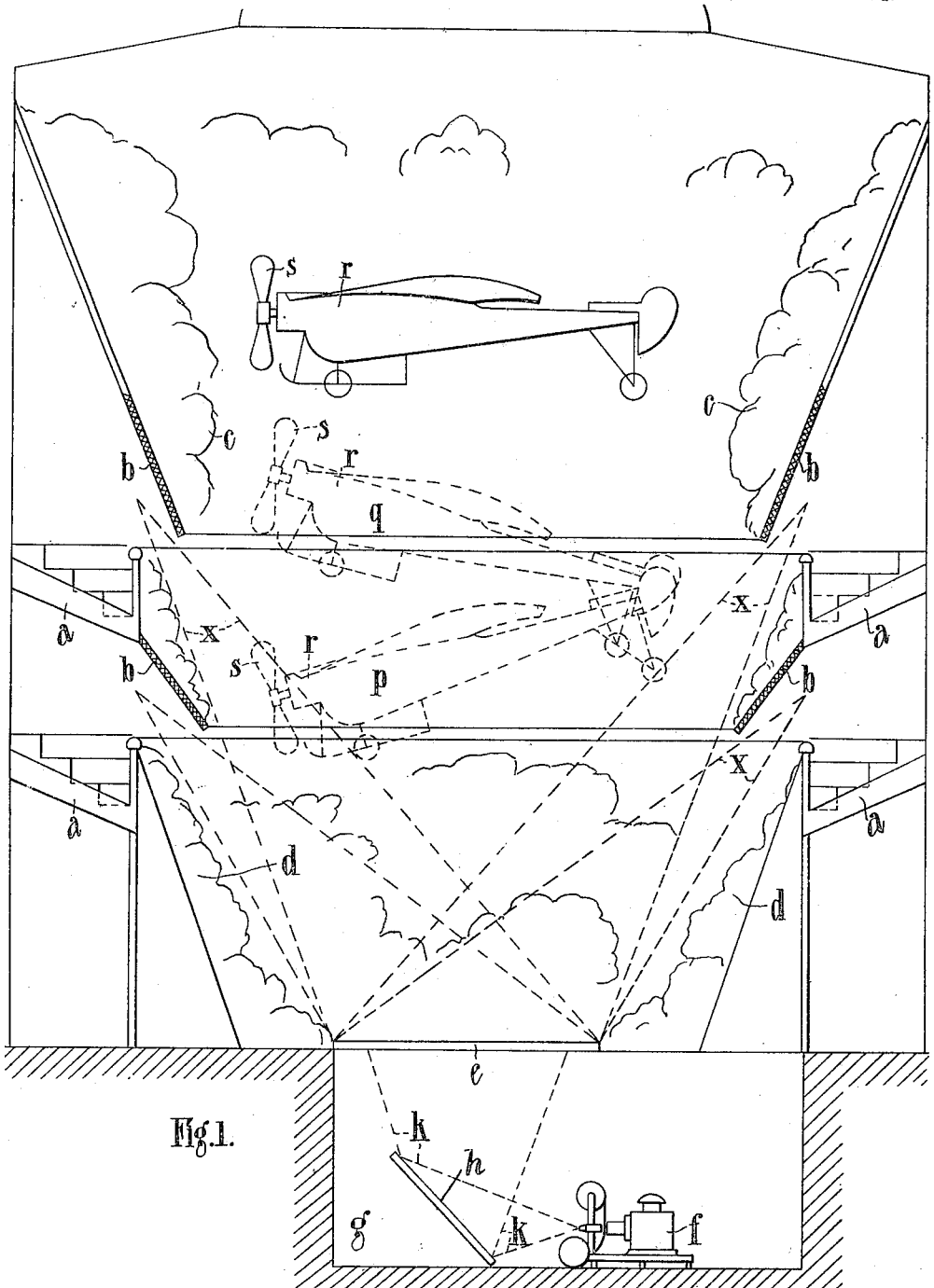
Figure 2:
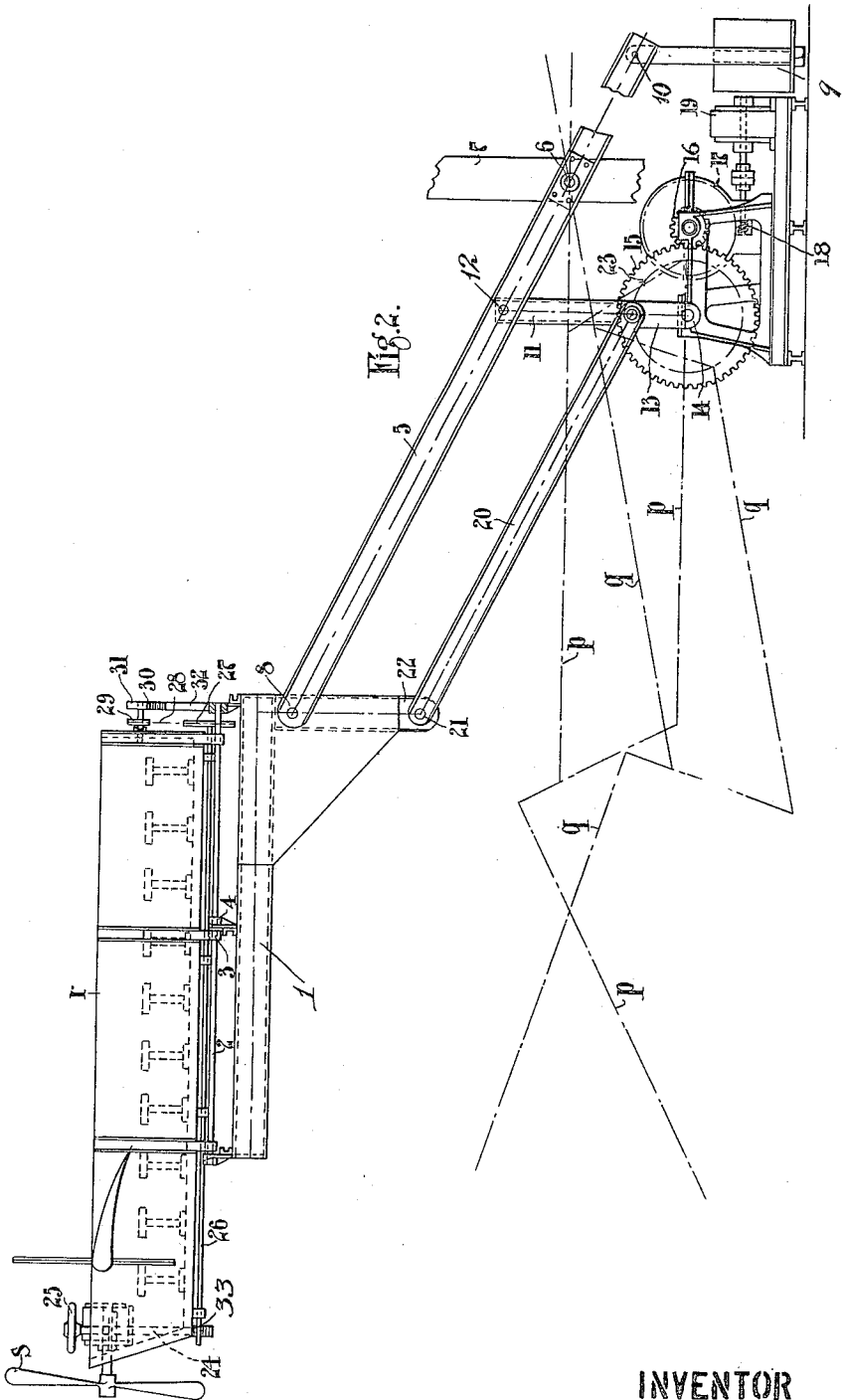

Referring now to the accompanying drawings; Figure 1 shows diagrammatically the general arrangement of a building suitable for producing the illusion, while Fig. 2 is a side elevation and Fig. 3 an end elevation of the aeroplane structure above mentioned.

In carrying the invention into effect the audience is accommodated in a building resembling a theater having, as shown in Fig. 1, galleries $a$ from which extends downward a suitable frame-work $b$ carrying scenery $c$, representing clouds when viewed from the outside, this scenery being made of gauze or other transparent material permitting the audience in the gallery beneath to view the entire space surrounded by the galleries. From the lowest gallery cloud scenery $d$ forms an artistic setting or frame of a picture screen $e$ stretched horizontally over a convenient area. On this screen animated pictures which have been taken from midair, preferably from an actual aeroplane during flight, are projected by a biograph $f$ onto a mirror $h$ situated in a pit $g$ below the screen $e$ and reflecting the light as indicated by the dotted lines $k$.

Figure 3:
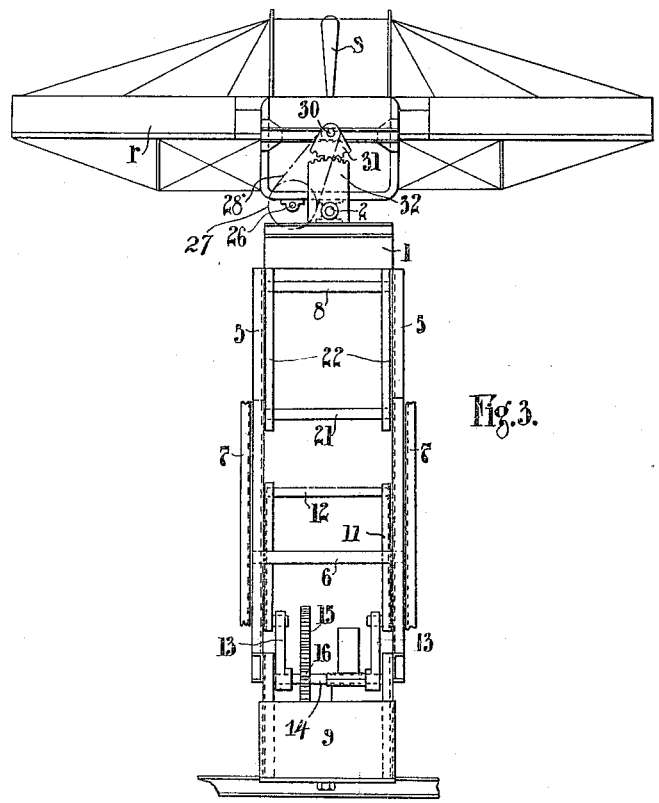

Some of the audience view the picture screen $e$ from an aeroplane-like structure $r$ which, according to the present invention, is moved vertically in the space above the screen while simultaneously being tilted longitudinally in order to imitate, as far as possible, the movement of an actual aeroplane while in flight. For this purpose the structure $r$ as shown in detail in Figs. 2 and 3, is supported upon a platform 1 to which it is connected by a shaft 2 in bearings 3 and 4, carried respectively by the structure $r$ and platform 1, the former of which can thus be rocked or tilted transversely. The platform 1 is supported in mid-air by a link-work mechanism, which comprises two beams 5 adapted to have an angular movement about a shaft 6 supported between two supporting pillars 7 of the building structure. These beams are attached at their upper ends by a shaft 8 to the platform 1, the total load of which is counterbalanced by a weight 9 attached to the beams 5 at 10.

The necessary oscillating movement is imparted to the beams 5 by two links 11 pin connected at one end to the beams 5 by a shaft 12, and at the other end to separate cranks 13 both of which are keyed to a shaft 14 driven through toothed gearing 15, 16, 17 and a worm gearing 18 by an electric motor 19. The cranks 13 are also pin connected to one end of the links 20 which are parallel to the beams 5 and at their other ends are connected by a shaft 21 to a lower part 22 of the platform 1. The shafts 21, 8 and 12 and the pins of the cranks 13 are situated at the corners of a parallelogram, the various links thus forming a complete parallelogram link-work. The electric motor 19 drives the cranks 13 in a clockwise direction as indicated by the arrow 23, the beams 5 being oscillated about the shaft 6, so that they impart an up and down movement to the platform 1 of the aeroplane structure $r$, which in virtue of being connected to the links 20 is at the same time given an angular movement about the shaft 8 whereby during ascent the aeroplane structure is inclined longitudinally so that its front end is directed upward as indicated by the dotted lines $q$ and downward during descent as indicated by the dotted lines $p$. The movement thus imparted to the aeroplane structure resembles more or less that of an actual aeroplane during ascent and descent.

In order to effect the transverse tilting of the aeroplane structure $r$ for the purpose of imitating the movement of an actual aeroplane during banking, a suitable mechanism, either hand or automatically operated, may be provided. In the form shown, this comprises a downwardly extending shaft 24 having at one end a hand wheel 25 and the other a worm, which engages with a pinion 33 on a shaft 26 running longitudinally along the under side of the aeroplane structure $r$ and terminating in a toothed wheel 27. The latter by means of a chain 28 drives a pinion 29 mounted upon a shaft 30, carrying a quadrant 31 which engages with a quadrant 32 rigidly attached to the platform 1.

Usually the aeroplane-like structure $r$ is provided with a revolving propeller $s$ for creating an artificial wind and with other accessories likely to assist in giving a more realistic effect. In this way the audience in the structure $r$ experience movements similar to those of an actual aeroplane, and consequently, when viewing the pictures shown on the screen $e$, receive the impression of being in an aeroplane from which they are looking through an opening in the clouds onto the land beneath.

Having now described my invention, what I claim as new and desire to secure by Letters Patent is:—

1. A recreation device comprising in combination, a passenger-carrying structure, means for imparting thereto motions analogous to those of an aeroplane in flight, a surface below said structure and means for projecting on the surface animated pictures taken from mid air in order thereby to convey the sensation of an aeroplane flight to the occupants of said structure.

2. A recreation device comprising in combination a passenger-carrying structure, a horizontal screen situated below said structure, means for projecting on the screen animated pictures taken from mid air, and means for directing the front end of said structure upward during ascent and downward during descent.

3. A recreation device comprising in combination a passenger-carrying structure, a screen situated below said structure, means for exhibiting on said screen animated pictures obtained from an aeroplane during flight and means for imparting to said structure movements substantially analogous to those of the aeroplane from which the pictures were obtained.

4. A recreation device comprising in combination a passenger-carrying structure, a screen situated below said structure, means for projecting on the latter animated pictures taken from mid air, means for inclining said structure upward during ascent and downward during descent and means for transversely tilting the structure in order thereby to convey the sensation of an aeroplane flight to the occupants of said structure.

5. A recreation device comprising in combination a passenger-carrying structure, a member capable of angular movement in a vertical plane about a fixed axis, said member being connected at one end to said structure, means for oscillating said member and simultaneously directing the structure upward during ascent and downward during descent and means for exhibiting below said structure animated pictures taken from mid-air.

6. A recreation device comprising in combination a passenger-carrying structure, a platform supporting the latter, a member capable of angular movement in a vertical plane, said member being connected at one end to said platform, a counterbalancing weight at the other end of said member, a rotating crank, a link connecting said crank with said member at a point between the fixed axis and the point of connection to the platform, another link connecting the crank with the platform below the point at which the member is connected to the platform whereby the passenger-carrying structure is caused to be inclined upward during ascent and downward during descent, and means for exhibiting on a horizontal plane below said structure animated pictures taken from mid-air in order that the passengers in the structure shall thereby experience the sensation of an aeroplane flight.

7. A recreation device comprising in combination a passenger-carrying structure, a platform supporting the latter, a member capable of angular movement in a vertical plane, said member being connected at one end to said platform, a counterbalancing weight at the other end of said member, a rotating crank, a link connecting said crank with said member at a point between the fixed axis and the point of connection to the platform, another link connecting the crank with the platform below the point at which the member is connected to the platform, whereby the passenger-carrying structure is caused to be inclined upward during ascent and downward during descent, means for transversely tilting the structure to imitate banking, and means for exhibiting on a horizontal plane below said structure animated pictures taken from mid-air in order that the passengers in the structure shall thereby experience the sensation of an aeroplane flight.

8. A recreation device comprising in combination a horizontal screen, means for projecting thereon animated pictures obtained from mid-air, cloud scenery surrounding said screen, a passenger-carrying structure resembling an aeroplane, a member supporting said structure above the picture screen, said member being capable of angular movement about a fixed axis, means effecting oscillation of said member about its fixed axis and of the structure about its axis of support, and means for tilting the structure transversely, thereby causing the structure to partake of movements resembling those of an aeroplane so that the occupants of the structure experience the sensation of an aeroplane flight.

In testimony whereof I have signed my name to this specification in the presence of two subscribing witnesses.

HENRY SALSBURY.

Witnesses:
P. A. OUTHWAITE,
H. D. JAMESON.